United States Patent [19]

Mohnach

[11] Patent Number: 5,392,489
[45] Date of Patent: Feb. 28, 1995

[54] ANTILIFT WIPER BLADE ASSEMBLY WITH INTEGRAL FLEXOR AND AIRFOIL

[75] Inventor: Michael G. Mohnach, Valparaiso, Ind.

[73] Assignee: Cooper Industries, Inc., Houston, Tex.

[21] Appl. No.: 38,253

[22] Filed: Mar. 29, 1993

Related U.S. Application Data

[63] Continuation of Ser. No. 899,037, Jun. 15, 1992, abandoned, which is a continuation of Ser. No. 714,247, Jun. 12, 1991, abandoned.

[51] Int. Cl.⁶ .............................. B60S 1/38; B60S 1/40
[52] U.S. Cl. .................................................. 15/250.42
[58] Field of Search ............ 15/250.42, 250.41, 250.35, 15/250.36, 250.2

[56] References Cited

U.S. PATENT DOCUMENTS

| Re. 29,392 | 9/1977 | Moorhead et al. | 15/250.42 |
|---|---|---|---|
| 3,037,233 | 6/1962 | Peros et al. | 15/250.36 |
| 3,296,647 | 1/1967 | Gumbleton | 15/250.42 |
| 4,400,845 | 8/1983 | Noguchi et al. | 15/250.42 |
| 4,561,143 | 12/1985 | Beneteau | 15/250.2 |
| 4,570,284 | 2/1986 | Vector | 15/250.2 |
| 4,590,638 | 5/1986 | Beneteau | 15/250.2 |
| 4,989,290 | 2/1991 | Hoshino | 15/250.2 |

FOREIGN PATENT DOCUMENTS

| 1237303 | 6/1960 | France . | |
|---|---|---|---|
| 2610265 | 8/1988 | France | 15/250.04 |
| 2639147 | 3/1978 | Germany . | |
| 2839587 | 3/1980 | Germany | 15/250.2 |
| 942001 | 11/1963 | United Kingdom . | |
| 2106775 | 4/1985 | United Kingdom . | |

Primary Examiner—Timothy F. Simone
Assistant Examiner—Gary K. Graham
Attorney, Agent, or Firm—Wood, Phillips, VanSanten, Clark & Mortimer

[57] ABSTRACT

An antilift wiper blade assembly for clearing a generally nonplanar vehicular windshield includes a pressure-distributing superstructure and a resilient wiping element. An elongated flexor interconnects the wiping element and the superstructure and has a longitudinally extending channel engaging the wiping element. A pair of laterally extending flanges are spaced above the bottom wall of the flexor and are engaged by the yoke elements, with the wiping element projecting through an elongated opening formed in the bottom wall of the flexor and into contact with the windshield. An upwardly curved airfoil extends tangentially from the bottom face of the flexor to generate an aerodynamic force which urges the wiping element into engagement with the windshield. A number of parallel slits are spaced along the length of the airfoil to partition the airfoil into a plurality of independently deformable aerodynamic force generating fins.

4 Claims, 2 Drawing Sheets

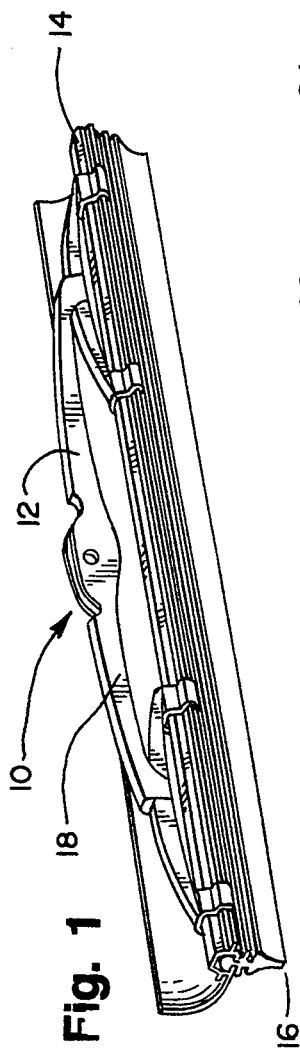
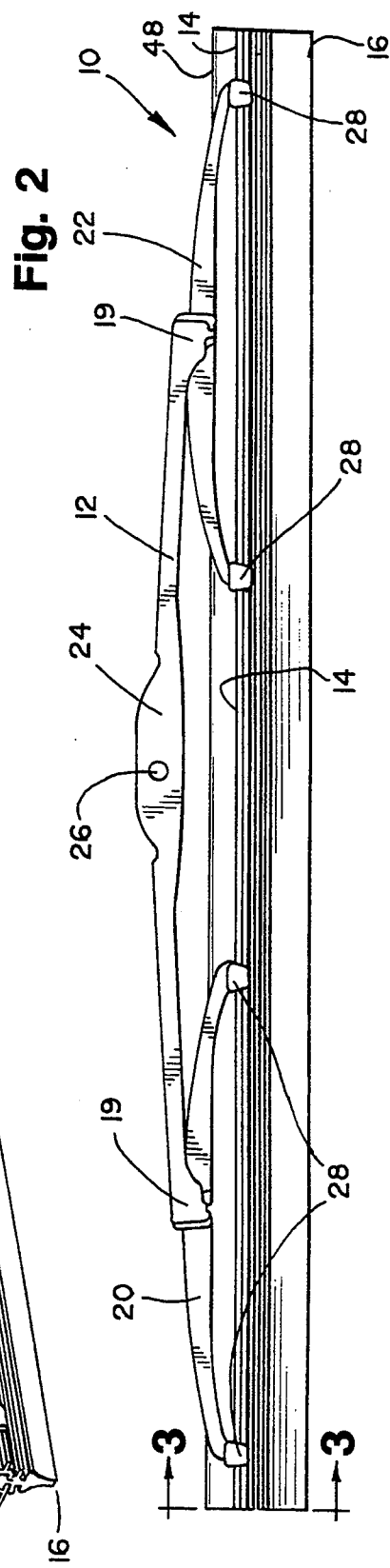
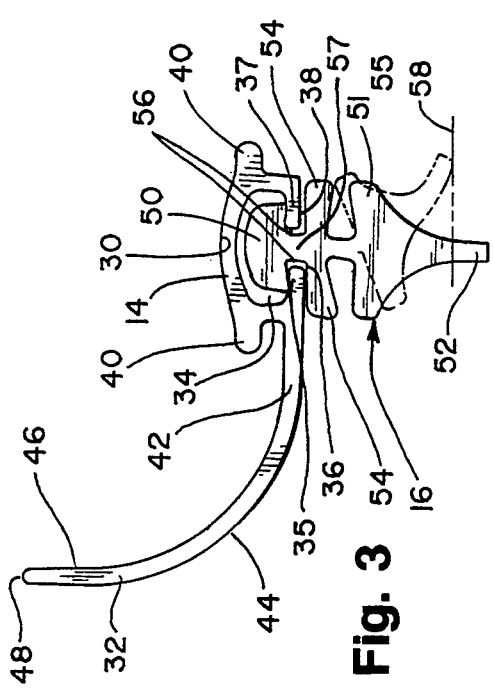
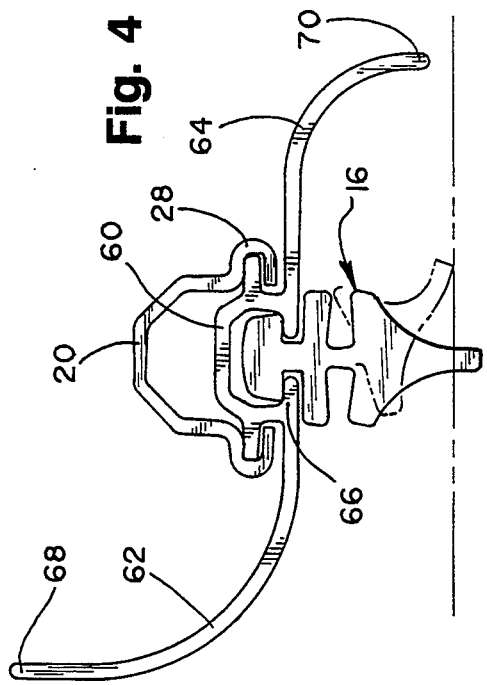

ANTILIFT WIPER BLADE ASSEMBLY WITH INTEGRAL FLEXOR AND AIRFOIL

This application is a continuation of application Ser. No. 07/899,037, filed Jun. 15, 1992, now abandoned, which is a continuation of Ser. No. 07/714,247, filed Jun. 12, 1991, now abandoned.

BACKGROUND OF THE INVENTION

1. Field of the Invention

The present invention is directed to windshield wiper blade assemblies for vehicular windshields, and more particularly, toward windshield wiper blade assemblies having curved surfaces for generating an aerodynamic antilift force.

2. Background Art

Numerous attempts have been made at improving the antilift characteristics of a conventional windshield wiper blade through the attachment of air deflecting surfaces to the wiper arm or to the wiper blade assembly. One approach has been to attach an air deflector to the superstructure of the wiper blade assembly. Such designs have proven costly, difficult to manufacture, and are not feasible for retrofitting existing vehicles without replacing the entire wiper blade superstructure. Another approach has been to form the air deflecting surface on the wiping element, but this proved impractical and did not work well.

An alternative approach to solving this problem has been to form the air deflecting surface integrally with a flexible stiffening structure, known in the art as a flexor or backing strip, which flexor interconnects the wiper superstructure and the wiping element. While this proposal provides a simpler construction and facilitates the installation of antilift features within existing wiper assemblies, it has not been possible to form such flexors without degrading critical aspects of the current wiper blade performance or installation capability. In particular, in order to assemble the superstructure containing the airfoil, openings had to be provided in the airfoil through which the attaching claws had to extend resulting in breaks in the airfoil surface with the resulting deterioration of the airfoil affect.

The purpose of providing a flexible stiffening member such as a flexor on the wiping element of a wiper blade assembly is to allow the wiping element to completely conform to the generally nonplanar geometry of a vehicular windshield throughout the full wipe pattern on the windshield. By integrally forming the deflecting surface directly on the flexor, the flexural capability of the flexor, and, hence, the ability of the wiper to conform to the shape of the windshield and thereby optimize the windshield clearing capability of the wiper has in the past been degraded.

The present invention is directed toward overcoming one or more of the problems discussed above.

SUMMARY OF THE INVENTION

The present invention comprehends an antilift wiper blade assembly for clearing a generally nonplanar vehicular windshield and has a pressure-distributing superstructure with a number of supporting yoke elements and an elongate resilient wiping element. An improved flexor member interconnects the wiping element and the superstructure and has an integral curved foil for generating an aerodynamic force normal and towards the windshield while permitting flexure of the flexor in one plane but resisting flexure of the flexor in a second plane transverse to the first plane.

A pair of laterally extending flanges are formed above the bottom face of the flexor and are engaged by the yoke elements, with the wiping element projecting through an elongated opening formed in the bottom face of the flexor and engaging the windshield. The airfoil without claw openings is upwardly curved and extends tangentially from the bottom face of the flexor to generate an aerodynamic force which urges the wiping element into engagement with the windshield. A number of parallel slits may be spaced along the length of the airfoil to partition the airfoil into a plurality of independently deformable aerodynamic force generating fins.

BRIEF DESCRIPTION OF THE DRAWING

The features of this invention which are believed to be novel are set forth with particularity in the appended claims. The invention, together with its objects and the following description taken in conjunction with the accompanying drawings, in which like reference numerals identify like elements in the figures and in which:

FIG. 1 is perspective view of a wiper blade assembly embodying the present invention;

FIG. 2 is an elevational front view of the wiper blade assembly shown in FIG. 1;

FIG. 3 is an elevational end view of the wiper blade assembly shown in FIG. 2, with the wiper element shown deformed in phantom lines;

FIG. 4 is an elevational end view of an alternative wiper blade assembly showing a flexor having dual integral airfoils, with the wiper element shown deformed in phantom lines;

DESCRIPTION OF THE PREFERRED EMBODIMENTS

Figure 5:
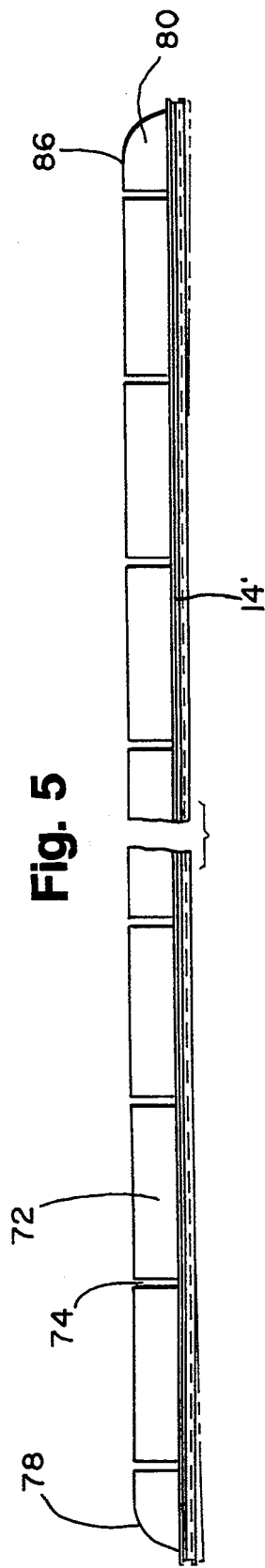
FIG. 5 is an elevational front view of a second alternative embodiment of a flexor with a portion of the wiper element shown in phantom.

Referring to FIGS. 1-3, an antiwindlift wiper blade assembly is generally designated 10 and includes a superstructure 12 in engagement with an elongate flexor 14 which, in turn, carries a resilient wiping element 16. The superstructure 12 comprises a main or primary yoke 18 having ends 19 pivotally engaging a number of intermediate secondary yokes 20, 22. While the superstructure 12 is shown to have only two secondary yokes 20, 22, it should be understood that the present invention comprehends alternative embodiments providing any number of secondary or tertiary yokes attached along the length of the primary or main yoke 18. The main yoke 18 has a connecting portion 24 intermediate the ends 19, the illustrated form of connecting portion 24 includes a through-bore 26 which is adapted for pivotal connection with an oscillatory wiper arm and driving means for use in conjunction with the clearing of a vehicular windshield. Any existing form of connecting portion and superstructure is acceptable. The secondary support yokes 20, 22 have claws 28 positioned at the ends thereof for engaging a portion of the flexor 14, as will be described below.

As shown in FIG. 3, the flexor or backing member 14 comprises an elongate channel or track 30 with an integral airfoil 32. The channel or track 30 has an interior receiving chamber 34 with an elongated opening 36 formed in the bottom wall 38 of the flexor to define a pair of aligned inwardly directed ledges 35, 37. A pair of oppositely and outwardly extending flanges 40 are formed on the sides of the channel 30 and are spaced above the bottom wall 38. The airfoil 32 is of uniform thickness throughout which thickness is substantially equal to the thickness of the ledges 35, 36 of the bottom wall 38. The airfoil 32 extends outwardly and continuously from the one ledge 35 of the bottom wall and is substantially tangential with the bottom wall 38. The airfoil 32 has a uniform curvature commencing with a laterally projecting portion 42, next an upwardly opening curved portion 44, and finally an upwardly directed portion 46. Each of the portions 42, 44, 46 are tangentially integrated so as to define a smooth uniform and circular curvature extending from the bottom wall 38 of flexor 14 to an upper edge 48.

Wiping element 16 has an enlarged retention bead or head portion 50 and a resilient enlarged body portion 51 with a wiping edge 52. A pair of transverse flanges 54 extend laterally between the head portion 50 and the body portion 51 to define a pair of parallel grooves 56 between the flanges 54 and the head portion and to define a hingelike portion 55 between the flanges 54 and the body portion 51. Head portion 50 of the wiping element is received in the receiving chamber 34 of channel 30 in the flexor 14 and has a neck 57 which extends downwardly through opening 36, with the ledges 35, 37 of the bottom wall of the flexor engaging in the grooves 56 and the transverse flanges 54 abutting the underside of the flexor. The hinge like portion 55 permits layover of the body portion relative to the head portion 50 as the wiping direction of the blade is changed. In order to engage the assembled flexor 14 and wiping element 16 with the superstructure 12, the claws 28 of the yokes 20, 22 have a pair of inwardly directed lips for slidably receiving the laterally extending flanges 40 on the flexor. Because the airfoil extends from the flexor at a location spaced below the flanges 40, the exemplary flexor can be easily installed and replaced in currently existing superstructures.

In operation, the flexibility of the flexor 14 ensures complete engagement of the wiping edge 52 of the wiping element with a generally nonplanar windshield 48, shown in broken lines in FIG. 3. Integral airfoil 32 deflects an oncoming air stream to generate an aerodynamic down force on the blade assembly in a direction normal to the windshield, thereby preventing lifting of the wiping edge 52 from the windshield and adding to the pressure of the wiper arm to urge the wiper blade into engagement with the windshield.

As noted previously, the capability of the elongate flexor 14 to flex within a plane defined by the channel 30 and wiping edge 52 and normal to the windshield surface is essential to conformity of the wiping edge with the windshield. While previous designs have proposed the use of an integral air foil, these designs have significantly degraded the flexural characteristics of the flexor. By providing the lateral extending portion 42 of the foil 32, the curved portion 44 and upright portion 46 are substantially offset from the channel or track so as to minimize the detrimental effect on the flexural capability of the channel 30.

An alternative wiper blade assembly is illustrated in FIG. 4 and has a flexor 60 interconnecting a resilient wiper element 16 with the claws 28 of a support yoke 20. Flexor 60 has an upwardly curved integral airfoil 62 similar to that described previously and extending tangentially from the bottom wall 66 of flexor 60. A downwardly curved airfoil 64 extends opposite the upwardly curved airfoil and is also continuously integrated with bottom wall 66. The dual airfoil design is particularly useful in applications in which the upper edge 68 of airfoil 62 induces a turbulent flow of air about the flexor in such a way that forces which tend to rotate the blade assembly in a clockwise direction are developed. In order to oppose this twisting rotation, as the flexor 14 begins to rotate the end 70 of the downturned airfoil 64 contacts the windshield and prevents further rotation.

Figure 6:
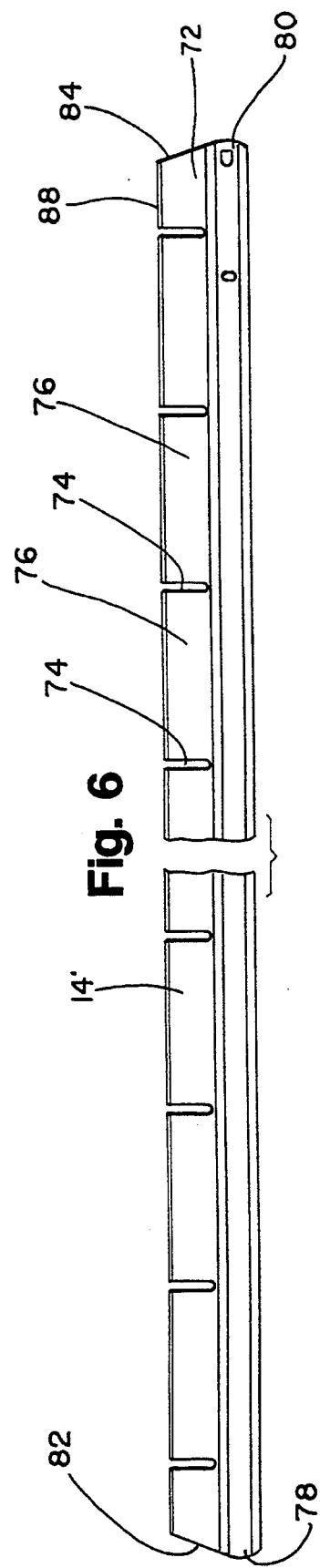
FIG. 6 is a top plan view of the flexor illustrated in FIG. 5.
Figure 7:
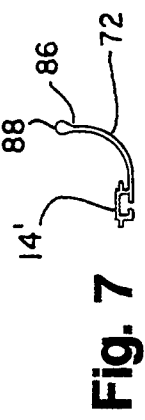
FIG. 7 is an elevational end view of the wiper blade assembly illustrated in FIG. 5.

In an alternative embodiment, as shown in FIGS. 5-7, a flexor 14' has an upwardly curved integral airfoil 72. A number of parallel slits 74 are formed in the airfoil and define a plurality of independently deformable fins 76. The additional flexibility of the flexor provided by the fins improves the seal between the wiping edge of the wiping element and the windshield to enhance the performance of the wiper blade assembly. The embodiment illustrated in FIGS. 5-7 also includes a number of modifications provided to minimize the number of potentially sharp edges formed on the flexor in order to comply with recent safety regulations. Specifically, opposite ends 78 and 80 of the flexor are curved, with the trailing edge of the flexor being continuously integrated into the airfoil. Airfoil 72 has tapered end surfaces 82 and 84 which extend substantially tangentially from corresponding flexor ends 78 and 80. The trailing edge 86 of airfoil 72 terminates in a bulbous projection 88 which is intended to further reduce the number of abrupt square edges on the wiper blade assembly.

The disclosed wiper blade assembly prevents a wiping element from lifting from a windshield by means of generating an aerodynamic down force with an air-deflecting foil. The foil is formed to minimally impact the flexural rigidity of the wiping element and permit the simple installation of the flexor in a generally known support yoke.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An antilift wiper blade assembly for clearing a nonplanar vehicular windshield including a pressure-distributing superstructure having a plurality of supporting yoke elements and an elongated resilient wiping element, the improvement comprising:

an elongated flexor interconnecting the wiping element and the superstructure, the flexor having an elongate channel extending over the entire length of the wiping element for receiving a retention bead portion of the wiping element;

the channel of the flexor having a planar bottom wall, said bottom wall having a pair of inwardly directed spaced apart ledges of uniform thickness defining an opening in the bottom wall of the channel, the wiping element having a pair of grooves between the bead portion and a body portion for receiving the inwardly directed ledges of the bottom wall, the body portion of the wiping element having a wiping edge for contacting the surface of the windshield, the flexor having a pair of laterally outwardly extending flanges spaced above the bottom wall of the flexor and engageable with claws of the yoke elements, and the flexor having an airfoil integrally formed with one of said ledges of the bottom wall, said airfoil having a uniform thickness equal to the thickness of the bottom wall of the flexor, said airfoil extends laterally from said bottom wall defining a laterally extending portion and being uniformly curved upwardly from a tangent to a plane coincident with the bottom wall of the channel defining a curved and upright portion to terminate in a plane transverse to the plane of the bottom wall, the laterally extending portion of the airfoil and the curved and upright portion of the airfoil are offset from the channel to minimize a detrimental effect on the flexural capability of the channel of the flexor whereby an air stream stalking the airfoil will generate an aerodynamic force on the blade assembly normal to the windshield adding to the pressure of the wiper arm to urge the blade into conformance with the surface of the windshield.

2. The antilift wiper blade assembly of claim 1 in which the laterally extending portion of the airfoil has a planar portion extending outwardly from the one of said ledges of the bottom wall of the channel and is tangent to the bottom wall of the flexor and the curved and upright portion of the airfoil is uniformly curved and continuously integrated with said laterally extending portion, said planar portion of the laterally extending portion of the airfoil has a length sufficient to offset said curved and upright portion outwardly of one of said flanges of the flexor.

3. The antilift wiper blade assembly of claim 2 in which the curved and upright portion of the airfoil terminates in an edge portion lying in a plane extending perpendicular to the windshield and parallel slits extending from the edge portion of the airfoil perpendicular to the flexor to form independent deformable fins adding flexibility to the flexor.

4. In an antilift wiper blade assembly for clearing a nonplanar vehicular windshield including a pressure-distributing superstructure and a resilient wiping element, an elongated flexor interconnecting the wiping element and the superstructure, said flexor comprising a channel with an upper portion for engaging with the superstructure and a lower portion for retaining the wiping element, the flexor further comprising an integrally formed airfoil having a first portion laterally extending from and tangential to a bottom wall of the lower portion of the channel, said airfoil having a second portion spaced outwardly of said upper portion of said channel, said airfoil having a uniformly circular curvature through an angle of 90 degrees for spacing said second portion of the airfoil outwardly of the upper portion of the channel, and said first and second portions of the airfoil having a uniform thickness equal to the thickness of the bottom wall of the channel whereby when an air stream flows toward the windshield and into contact with the blade the airfoil will produce an aerodynamic force to urge the wiping element into engagement with the windshield.

* * * * *